(12) United States Patent
Hemphill

(10) Patent No.: US 11,148,699 B1
(45) Date of Patent: Oct. 19, 2021

(54) MEDIA PRESENTATION SYSTEM AND METHOD OF USE

(71) Applicant: Sherice Hemphill, Houston, TX (US)

(72) Inventor: Sherice Hemphill, Houston, TX (US)

( * ) Notice: Subject to any disclaimer, the term of this patent is extended or adjusted under 35 U.S.C. 154(b) by 0 days.

(21) Appl. No.: 16/527,803

(22) Filed: Jul. 31, 2019

Related U.S. Application Data

(60) Provisional application No. 62/712,624, filed on Jul. 31, 2018.

(51) Int. Cl.
*B62B 9/00* (2006.01)
*B62B 9/26* (2006.01)
*B62B 9/14* (2006.01)

(52) U.S. Cl.
CPC ............... *B62B 9/26* (2013.01); *B62B 9/142* (2013.01)

(58) Field of Classification Search
CPC .................................. B62B 9/26; B62B 9/142
See application file for complete search history.

(56) References Cited

U.S. PATENT DOCUMENTS

| | | | | |
|---|---|---|---|---|
| 9,145,158 B2 * | 9/2015 | Cruz | ...................... | F16M 11/08 |
| 9,376,134 B2 * | 6/2016 | Spinella | ................... | B62B 9/14 |
| 2003/0218038 A1 * | 11/2003 | Chang | ..................... | F41C 33/02 |
| | | | | 224/647 |
| 2004/0258471 A1 * | 12/2004 | Granata | .................. | F16B 5/126 |
| | | | | 403/381 |
| 2008/0042384 A1 * | 2/2008 | Ferraioli | ................... | B62B 9/26 |
| | | | | 280/47.38 |
| 2008/0111331 A1 * | 5/2008 | Koehl | ....................... | B62B 9/26 |
| | | | | 280/47.38 |
| 2011/0164779 A1 * | 7/2011 | Cassidy | .................. | B62B 9/142 |
| | | | | 381/389 |
| 2013/0249202 A1 * | 9/2013 | White | ...................... | B62B 9/26 |
| | | | | 280/769 |
| 2015/0042131 A1 * | 2/2015 | Haas | ....................... | B60R 11/02 |
| | | | | 297/183.1 |
| 2015/0183352 A1 * | 7/2015 | Bowe | ...................... | B62B 9/142 |
| | | | | 297/184.11 |
| 2016/0311378 A1 * | 10/2016 | LaFargue | ................. | H04M 1/04 |
| 2019/0008256 A1 * | 1/2019 | Basham | ................... | A45C 3/02 |
| 2019/0253886 A1 * | 8/2019 | Lee | ........................ | H04M 1/185 |
| 2020/0062191 A1 * | 2/2020 | Ragner | ................... | B60R 11/02 |
| 2020/0266844 A1 * | 8/2020 | Fung | ...................... | B65D 33/14 |

* cited by examiner

*Primary Examiner* — Brian L Swenson
(74) *Attorney, Agent, or Firm* — Richard Eldredge; Eldredge Law Firm

(57) ABSTRACT

A media presentation system enables a caregiver to entertain a child in a buggy, stroller or the like by positioning a media device within view of the child while they rest in the buggy or stroller. The media device is attached to the inside of the canopy and could have a protective pocket, a mount, bands or the like to facilitate the attachment to thereto.

3 Claims, 6 Drawing Sheets

MEDIA PRESENTATION SYSTEM AND METHOD OF USE

BACKGROUND

1. Field of the Invention

The present invention relates generally to child care systems, and more specifically, to a child push along vehicles for carrying or transporting a person's offspring or ward from one location to another.

2. Description of Related Art

Child care systems are well known in the art and are effective means to improve the work or of a caregiver such as in providing shelter, food, health care or the like. For example, children must be transported and carried, for this purpose strollers, buggies and so on are used to allow the child to rest and reduce the work by allowing a person to push or pull the vehicle with the child therein. FIG. 1 depicts a conventional stroller system 101 having a seat 103 supported by a frame 105 having wheels 107 and a handle 109 attached thereto. During use, a child 111 is placed in the seat 103 and the system is pushed via the handle 109 forcing the wheel 107 to rotate.

One of the problems commonly associated with system 101 is its limited use. For example, the child is safe and moving easily but can become restless, upset or try to leave the seat. A common solution to this limit of the system 101 is to provide entertainment in the form of a toy or media device to the child 111. The limit of the use of the system 101 is further demonstrated when the child drops, throws or otherwise loses the provided entertainment.

Accordingly, although great strides have been made in the area of stroller systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
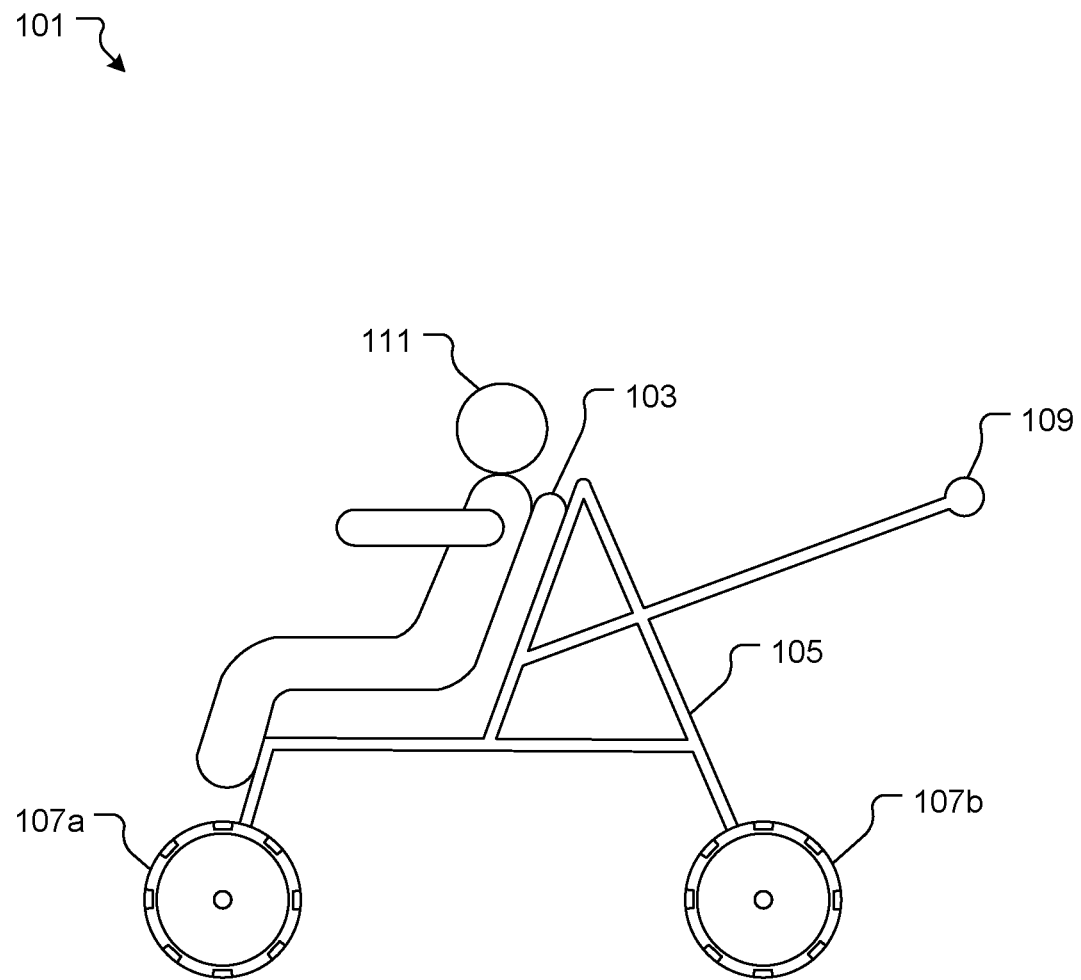
FIG. 1 is a side view of a common stroller system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional stroller systems. Specifically, the invention of the present application enables the display of entertainment to a child while a passenger in a stroller or the like. In addition, the invention prevents damage to the means of displaying the entertainment to the child. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
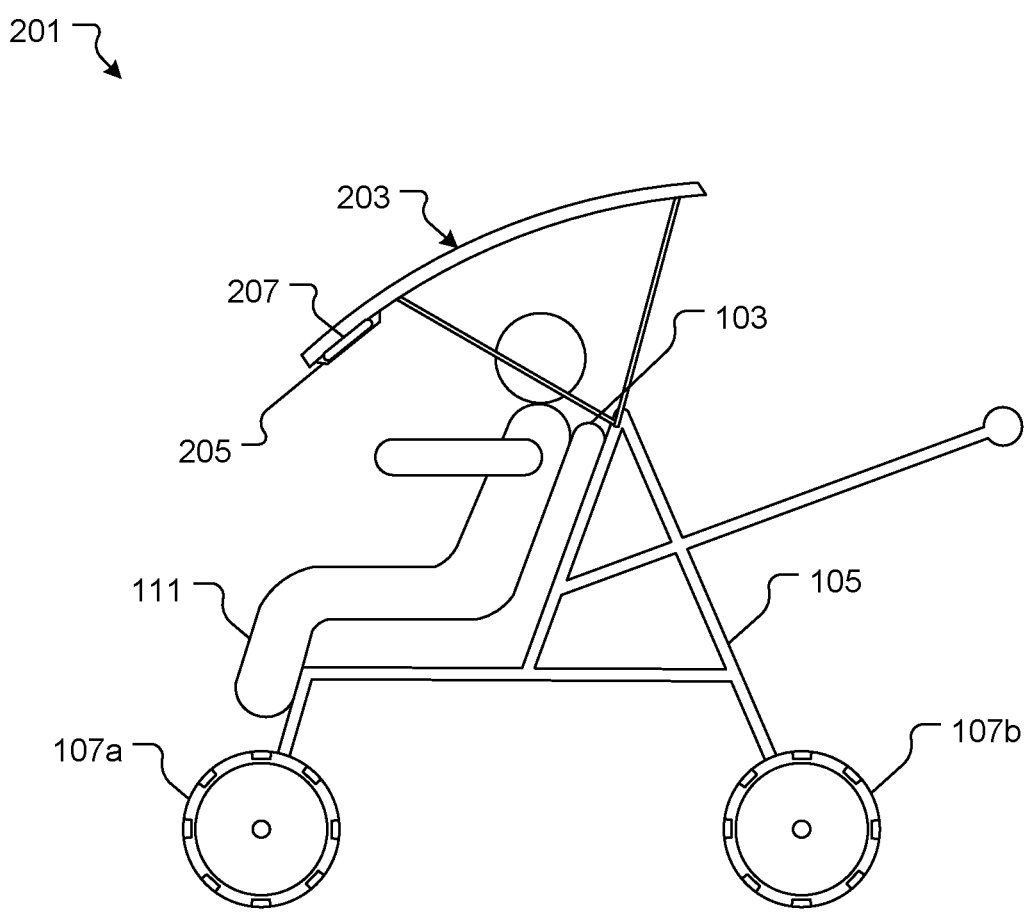
FIG. 2 is a side view of a media presentation system in accordance with a preferred embodiment of the present application.

Referring now to the drawings wherein like reference characters identify corresponding or similar elements throughout the several views, FIG. 2 depicts a side view of a media presentation system in accordance with a preferred embodiment of the present application. It will be appreciated that system 201 overcomes one or more of the above-listed problems commonly associated with conventional stroller systems.

In the contemplated embodiment, system 201 includes a stroller 101 with a canopy 203 attached to the frame 105 thereof, the canopy 203 including a pocket 205 attached thereto. The pocket configured to hold a media device 207.

Figure 3:
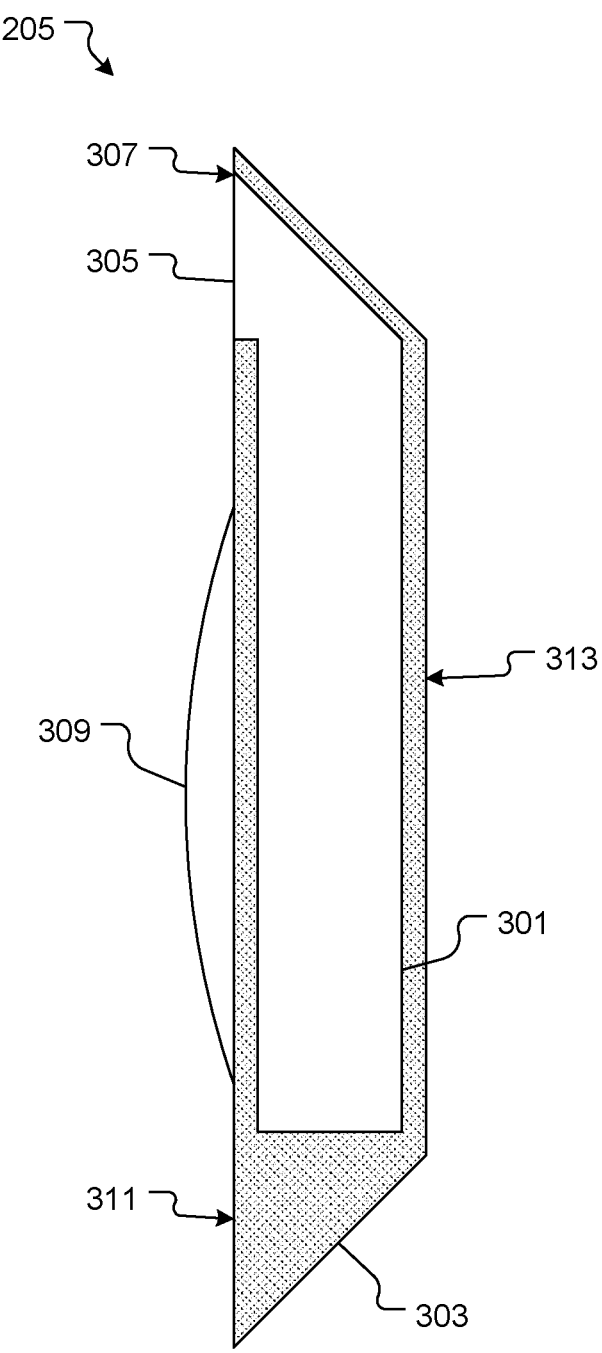
FIG. 3 is a cross-sectional side view of the pocket of FIG. 2.

In the primary embodiment the pocket 205, as depicted by FIG. 3, includes a space 301 enclosed by a body 303 having an opening 305 on a first end 307 permitting access to the space 301. The body 303 having adhesive areas 309 on the back surface 311 thereof that attach the pocket 205 to the canopy 203. In the present embodiment the front surface 313 of the body 303 is transparent.

It should be appreciated that one of the unique features believed characteristic of the present application is that pocket 205 facilitates the presentation of entertainment to the child while protecting the media device 207 from loss or damage.

Figure 4:
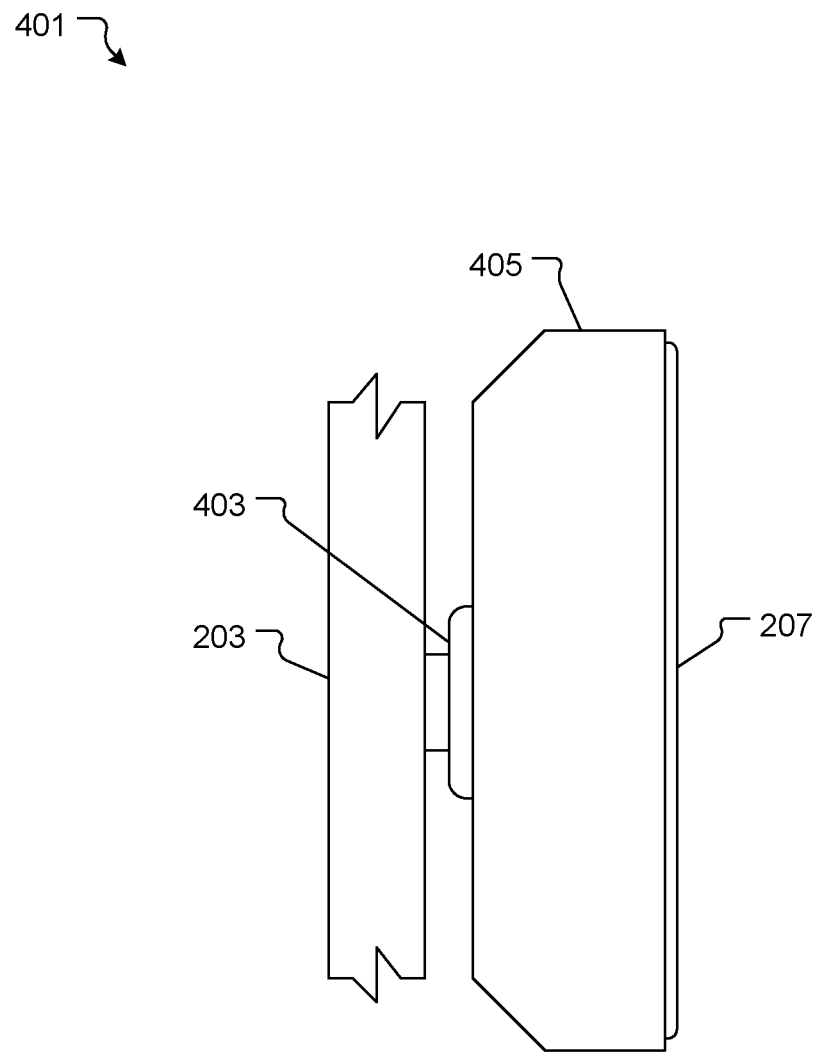
FIG. 4 is a detail side view of an alternative embodiment of the system of FIG. 2.

Referring now to FIG. 4 an alternative embodiment of system 201 is depicted. Embodiment 401 including a canopy 203 having a mount 403 attached thereto so as to enables a media device 207 in a case 405 to be attached thereto thus enabling the child 111 to view the media device 207. It is contemplated that the mount 403 could protrude or be flush from the canopy 203 or the case 405. It is also contemplated that the mount 403 could be mechanical, friction, magnetic in nature including such methods as interlocking loops.

Figure 5:
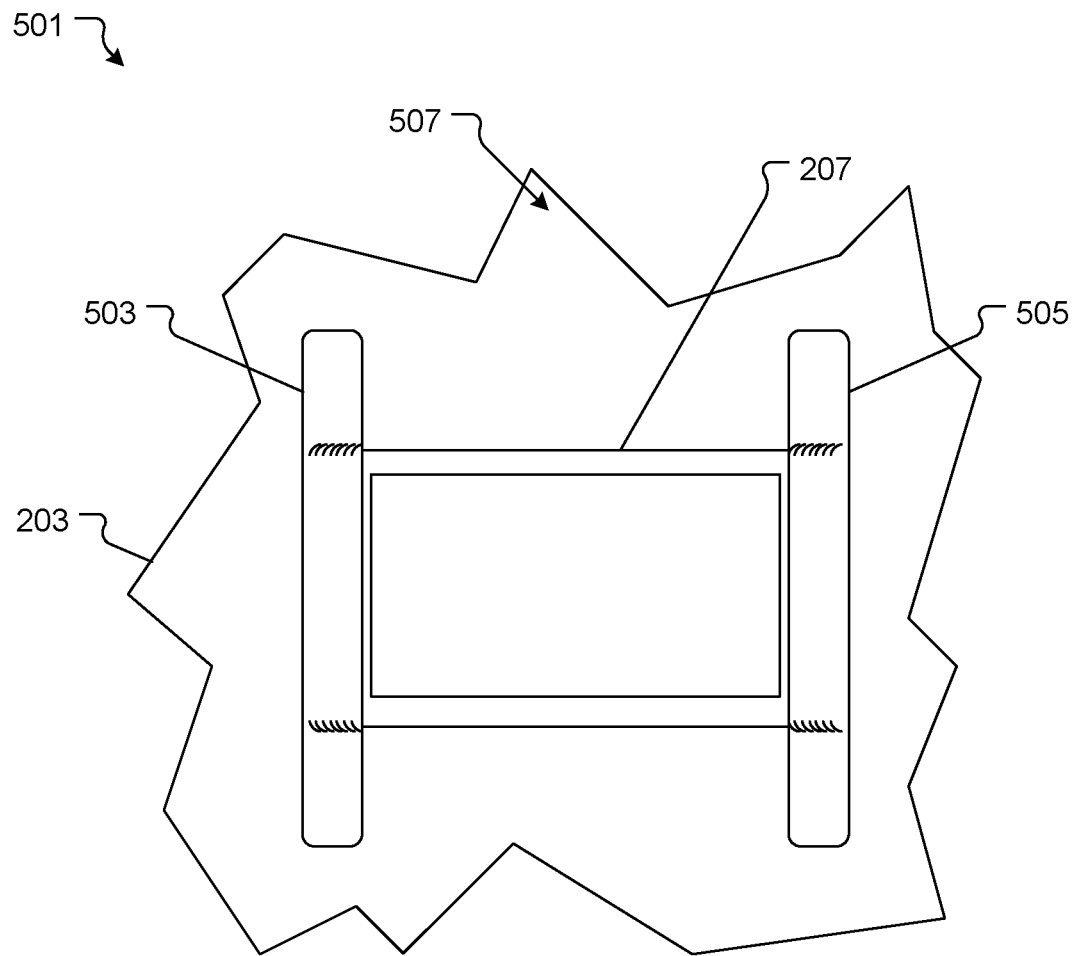
FIG. 5 is a front view of an alternative embodiment of the mount of FIG. 4.

Referring now to FIG. 5 an alternative embodiment of the mount 403 of FIG. 4 is depicted. Embodiment 501 including a first band 503 and a second band 505 each attached to the inside surface 507 of the canopy 203 and are configured to hold a media device 207 therebetween.

Figure 6:
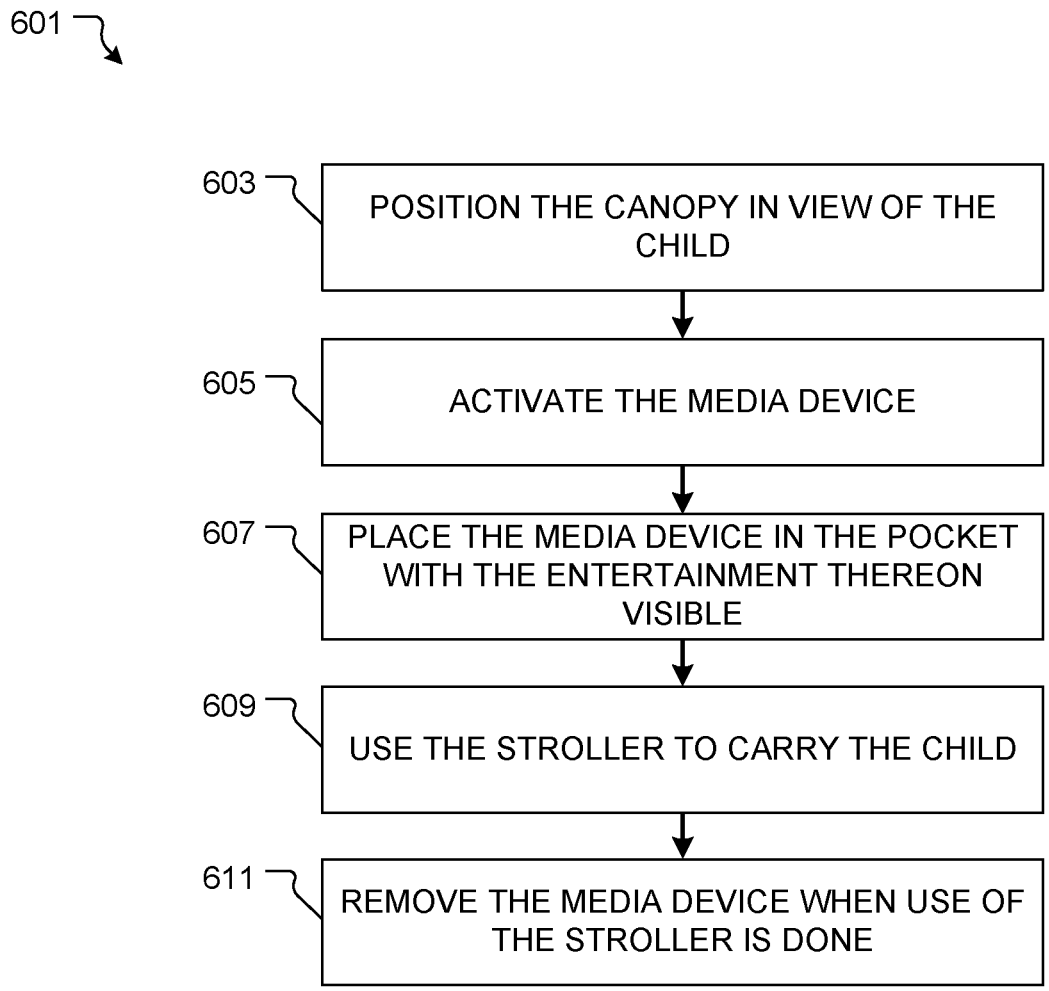
FIG. 6 is a flowchart of the preferred method of use of the system of FIG. 2.

The preferred method of use of the system 201 is depicted by FIG. 6. Method 601 including positioning the canopy within view of the child 603, activating the media device 605, placing the media device in the pocket so the playing entertainment is visible 607, using the stroller to carry the child 609 and removing the media deceive when use of the stroller is discontinued 611.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A media presentation system comprising
a vehicle configured to carry a child in a seat having a canopy, the canopy having a first surface;
wherein the first surface of the canopy faces the seat;
a pocket attached to the canopy, the pocket having:
a body with a first side and a second side, the first side at least partially composed of a transparent material, the first side and the second side run parallel to one another;
a space formed between the first side and the second side, the space forming an elongated length from a first end to a second end, the elongated length following a contouring of the first surface of the canopy;
an opening in communication with extending from the first side and into the space, the opening being positioned between the canopy and the first side when the pocket is attached to the canopy, the opening allowing a media device to pass therethrough and rest within the space; and
an adhesive secured to the first side;
wherein the first side is secured to the first surface via the adhesive the first side secured substantially flush to the first surface; and
wherein the opening faces the first surface; and
wherein the second side faces the seat;
the pocket configured to hold the media device in view of a child occupying the vehicle;
wherein the media device is provided for entertaining the child.

2. The system of claim 1 wherein the pocket is a case for the media device and attaches to the canopy via a mount.

3. The method of displaying entertaining media to a child, comprising:
providing the system of claim 1;
positioning the canopy within view of the child;
activating the media device;
placing the media device in the pocket so the playing entertainment is visible; using the stroller to carry the child; and
removing the media device when use of the stroller is discontinued.

* * * * *